United States Patent
Qiu et al.

(10) Patent No.: US 12,494,498 B2
(45) Date of Patent: Dec. 9, 2025

(54) SINGLE CORRUGATED FUEL CELL AND CELL STACK

(71) Applicant: SHANGHAI JIAO TONG UNIVERSITY, Shanghai (CN)

(72) Inventors: Diankai Qiu, Shanghai (CN); Shuxin Liao, Shanghai (CN); Linfa Peng, Shanghai (CN); Peiyun Yi, Shanghai (CN); Xinmin Lai, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 365 days.

(21) Appl. No.: 17/937,875

(22) Filed: Oct. 4, 2022

(65) Prior Publication Data
US 2023/0025359 A1  Jan. 26, 2023

Related U.S. Application Data

(63) Continuation of application No. PCT/CN2021/097634, filed on Jun. 1, 2021.

(30) Foreign Application Priority Data

Dec. 22, 2020 (CN) .......................... 202011531075.4

(51) Int. Cl.
  *H01M 8/1006* (2016.01)
  *H01M 8/0265* (2016.01)
  *H01M 8/2457* (2016.01)
(52) U.S. Cl.
  CPC ....... *H01M 8/1006* (2013.01); *H01M 8/0265* (2013.01); *H01M 8/2457* (2016.02)
(58) Field of Classification Search
  None
  See application file for complete search history.

(56) References Cited

U.S. PATENT DOCUMENTS

2002/0004158 A1* 1/2002 Suzuki ................ B29C 43/021
                                                          264/319
2002/0081477 A1* 6/2002 McLean ............. H01M 8/0273
                                                          429/492
(Continued)

FOREIGN PATENT DOCUMENTS

CN       101079494 A       11/2007
CN       101101989 A        1/2008
(Continued)

OTHER PUBLICATIONS

DE102008033209A1 translation (Year: 2008).*
(Continued)

*Primary Examiner* — Nicholas A Smith
*Assistant Examiner* — Amanda Rosenbaum
(74) *Attorney, Agent, or Firm* — HSML P. C.

(57) ABSTRACT

The invention relates to a single corrugated fuel cell and a cell stack. The single cell comprises an anode plate, a cathode plate, and a membrane electrode assembly; the anode plate is of a corrugated structure and a plurality of anode channels and anode ribs are arranged on the anode plate in parallel; the cathode plate is of a corrugated structure engaged with the anode plate and a plurality of cathode channels and cathode ribs are arranged on the cathode plate in parallel; the membrane electrode assembly is arranged between the anode plate and the cathode plate. The single cell presents a corrugated structure in a width direction of the channel. A plurality of single cells are stacked in sequence to form a fuel cell stack. Compared with the prior art, the invention significantly increases the reaction area per unit volume of the fuel cell through the corrugated structural design, thereby improving the power density of the fuel cell. In addition, the present invention has little change to the (Continued)

existing processing and manufacturing technology, and thus has high production feasibility.

12 Claims, 3 Drawing Sheets

(56) References Cited

U.S. PATENT DOCUMENTS

| | | | | |
|---|---|---|---|---|
| 2007/0026291 A1* | 2/2007 | Kim | ................... | H01M 8/1067 |
| | | | | 429/513 |
| 2010/0035108 A1* | 2/2010 | Sugiura | .............. | H01M 8/0258 |
| | | | | 429/483 |
| 2020/0112035 A1* | 4/2020 | Yamano | .............. | H01M 8/0206 |
| 2020/0212470 A1* | 7/2020 | Baird | .................. | H01M 8/2483 |

FOREIGN PATENT DOCUMENTS

| | | | |
|---|---|---|---|
| CN | 101465438 A | 6/2009 | |
| CN | 101937997 A | 1/2011 | |
| CN | 109390609 A | 2/2019 | |
| CN | 109768298 A | 5/2019 | |
| CN | 112615020 A | 4/2021 | |
| DE | 102008033209 A1 * | 1/2010 | .......... H01M 8/0258 |
| DE | 102019203321 A1 | 9/2020 | |
| JP | H10308227 A | 11/1998 | |
| JP | 2018133240 A | 8/2018 | |

OTHER PUBLICATIONS

International Search Report (with English translation) and Written Opinion issued in PCT/CN2021/097634, dated Aug. 26, 2021, 10 pages provided.

Office Action issued in Chinese Application No. CN202011531075.4, dated Sep. 9, 2021, with English machine translation.

* cited by examiner

SINGLE CORRUGATED FUEL CELL AND CELL STACK

BACKGROUND OF THE INVENTION

1. Technical Field

The present invention belongs to the technical field of fuel cells, and relates to a single fuel cell with corrugated structure characteristics and a cell stack.

2. Description of Related Art

With the depletion of fossil fuels, hydrogen energy has attracted increasing attention as a clean and efficient form of energy. A proton exchange membrane fuel cell (PEMFC) is a device that generates electricity through the electrochemical reaction of hydrogen and oxygen. In addition to the general characteristics of fuel cells such as high energy conversion efficiency and environmental friendliness, the PEMFC also has the outstanding advantages of rapid start-up at room temperature, no electrolyte loss, easy water discharge, high specific power, and high specific energy. A traditional PEMFC is mainly composed of bipolar plates (BPPs), membrane electrode assemblies (MEAs), and other components. The bipolar plate is divided into an anode plate and a cathode plate, which can implement current conduction in the cell, distribute the reaction gas and liquid coolant, discharge reaction products, and affect the uniform reaction and water and gas management of the fuel cell; in addition, the fuel cell is usually assembled by stacking a certain number of single cells to achieve higher voltage and power output.

With the continuous deepening of related research, the volume power density and mass power density of the PEMFC have been greatly improved, but there is still much space for large-scale application. There are two main methods to improve the power density of the PEMFC. One is to improve the material properties of fuel cell components, and the other is to improve the internal structure of the fuel cell. At present, the PEMFC mainly adopts the traditional plate-and-frame structure, and its internal structure is characterized in that the membrane electrode assembly in the cell adopts a common plate structure, and reactant channels and cooling channels are arranged on the bipolar plate. This structure has the advantages of convenient manufacturing, simple assembly, good water and gas management performance, and high flexibility in property deployment. However, the plate structure limits the reaction utilization rate of the membrane electrode assembly per unit volume, resulting in a limited increase in the power density of the fuel cell.

Through research on the prior art, it is found that a tubular fuel cell having a membrane electrode and supporting tubes integrated, disclosed in Chinese invention patent CN101465438A, adopts a no bipolar plate design. Although the reaction area can be increased, it is difficult to circulate a liquid coolant, which restricts the increase in power density and causes high processing difficulty and high mass production cost. Chinese invention patent CN109768298A discloses a fuel cell with a component that combines the functions of a bipolar plate and a gas diffusion layer (GDL) to simplify the bipolar plate. However, it is difficult to implement the gas diffusion layer containing flow channels, and both water management and cooling performance of the cell are compromised. Chinese invention patent CN101937997A adopts an arc-shaped fuel cell design, which can improve the mechanical properties of the cell components and the installation performance of the cell. However, the proportion of the membrane electrode assembly per unit volume in the cell changes slightly, and the increase in cell power density is limited.

BRIEF SUMMARY OF THE INVENTION

The present invention is intended to provide a single corrugated fuel cell and stack that can not only improve the power density of the fuel cell, but also ensure the hydrothermal management of the cell, and is easy to manufacture and assemble, in order to overcome the above-mentioned defects of the prior art.

The objective of the present invention can be achieved by the following technical solution: a single corrugated fuel cell, including an anode plate, a cathode plate, and a membrane electrode assembly, the anode plate being of a corrugated structure, a plurality of inclined anode channels with different heights of channel side plates and anode ribs with arbitrary slope being arranged on the anode plate in parallel, the cathode plate being of a corrugated structure engaged with the anode plate, a plurality of inclined cathode channels with different heights of channel side plates and cathode ribs with arbitrary slope being arranged on the cathode plate in parallel, the membrane electrode assembly being mounted between the anode plate and the cathode plate, the single cell presenting a corrugated structure in a width direction of the channel.

Further, the anode channels and the anode ribs are alternately distributed in parallel on the anode plate, the anode channels are respectively connected with an anode gas inlet and an anode gas outlet, and anode cooling channels are arranged at the back of the anode ribs and respectively connected with a cooling liquid inlet and a cooling liquid outlet.

Further, the cathode channels and the cathode ribs are alternately distributed in parallel on the cathode plate, the cathode channels are respectively connected with a cathode gas inlet and a cathode gas outlet, and cathode cooling channels are arranged at the back of the cathode ribs and respectively connected with the cooling liquid inlet and the cooling liquid outlet.

Further, a side of the bottom of the anode channel away from the membrane electrode assembly is of a closed planar structure, a side of the top of the anode channel in contact with the membrane electrode assembly is of an open structure, and an angle between an anode channel left side plate and the bottom of the anode channel and an angle between an anode channel right side plate and the bottom of the anode channel are both not less than 90°; a height difference between the two side plates of the anode channel directly affects the inclination of the top of the anode channel, the greater the height difference between the two side plates, the more inclined the top of the anode channel.

Further, the height difference between the two side plates of the adjacent anode channels, width of the adjacent anode channels, and width of the adjacent anode ribs are constant or vary according to a set rule.

Further, a side of the bottom of the cathode channel away from the membrane electrode assembly is of a closed planar structure, a side of a top of the cathode channel in contact with the membrane electrode assembly is of an open structure, and an angle between a cathode channel left side plate and the bottom of the cathode channel and an angle between a cathode channel right side plate and the bottom of the cathode channel are both not less than 90°; a height difference between the two side plates of the cathode channel directly affects the inclination of the top of the anode channel, the greater the height difference between the two side plates, the more inclined the top of the cathode channel; heights of the corresponding two side plates of the cathode channel and the anode channel can be complementary.

Further, the height difference between the two side plates of the adjacent cathode channels, width of the adjacent cathode channels, and width of the adjacent cathode ribs are correspondingly equal to the height difference between the two side plates of the adjacent anode channels, the width of the adjacent anode channels and the width of the adjacent anode ribs.

Further, the membrane electrode assembly is mounted between the anode plate and the cathode plate, an upper surface of the membrane electrode assembly is engaged with a lower surface of the anode plate, a lower surface of the membrane electrode assembly is engaged with an upper surface of the cathode plate, and the structure of the membrane electrode assembly is determined by the shape and structure of engagement positions on the anode plate and the cathode plate.

A stack including single corrugated fuel cells, the stack is formed by stacking a plurality of single fuel cells in sequence in the height direction of the cell, anode plates and cathode plates of adjacent single cells in the stack are oppositely assembled, anode cooling channels and cathode cooling channels together form the closed-section stack cooling channels, and the stack presents a corrugated structure along a width direction of the channel.

Further, all the single cells in the stack share an anode gas inlet, an anode gas outlet, a cathode gas inlet, a cathode gas outlet, a cooling liquid inlet, and a cooling liquid outlet, thereby achieving centralized water and gas distribution for all the cells in the stack.

As a preferred technical solution, the anode plate and the cathode plate of the corrugated structure are prepared from metal alloy sheets such as stainless steel sheets or titanium alloy sheets through blanking, stamping, punching, trimming, and other processes.

As a preferred technical solution, within a reasonable range of the forming process of the anode plate, the cathode plate, and the membrane electrode assembly, a large height difference between the two side plates of the channel is preferred. The larger the height difference between the two side plates of the channel, the higher the reaction area per unit volume and the greater the power density of the cell.

As a preferred technical solution, the height difference between the two side plates of adjacent channels, the width of adjacent anode channels, and the width of adjacent anode ribs remain constant. The uniform structural design is conducive to improving the stress distribution inside the cell, and can reduce the processing difficulty of parts, improve the yield, and reduce production costs.

As a preferred technical solution, before the stack is assembled, the anode plates and the cathode plates are connected by a laser welding process to form bipolar plates, and then the components are stacked.

Compared with the prior art, the present invention has the following advantages:

1) In the existing bipolar plate, the surfaces of the anode plate and the cathode plate in contact with the membrane electrode assembly are generally planar, and the membrane electrode assembly is of a planar structure. The present invention changes this existing design and changes the surfaces of the anode plate and the cathode plate in contact with the membrane electrode assembly into a non-planar structure and the membrane electrode assembly is sandwiched between the anode plate and the cathode plate, so that the section of the membrane electrode assembly becomes corrugated. The use of the corrugated bipolar plate and membrane electrode assembly structure can increase the reaction area and improve the effective area utilization rate of the fuel cell, thus improving the power density of the fuel cell. The power density can theoretically be improved by $\Delta P$ kW/kg, ignoring the change in the mass of the fuel cell stack caused by the corrugated membrane electrode assembly.

$$\Delta P = \frac{\mu \cdot \varepsilon}{\lambda}$$

In the formula, $\mu$ represents the increase of the reaction area of the corrugated membrane electrode assembly compared with the plate-shaped membrane electrode assembly;

$\varepsilon$ represents the output power provided by the membrane electrode assembly per unit area;

$\lambda$ represents the mass of the fuel cell stack.

2) The present invention retains the design of gas channels and cooling channels in the traditional plate-and-frame fuel cell, and has good water and gas distribution and temperature control capabilities.

3) The processing method and assembly process of the main parts of the present invention are implemented on the basis of little change and adjustment of the existing manufacturing technology, where other parts are kept unchanged and only the open surfaces of the anode channel and the cathode channel are changed into the inclined surfaces, thus hardly increasing the production cost.

4) The present invention can simultaneously adjust the contact surface of the anode rib plate and the membrane electrode assembly and the contact surface of the cathode rib plate and the membrane electrode assembly to the inclined plane by setting the height of the left and right side plates of the adjacent channels, which can further increase the reaction area of the fuel cell. This invention can also increase the contact surface of the bipolar plate and the membrane electrode assembly, and reduce the additional power loss caused by the contact resistance. In addition, the inclined contact surface between the bipolar plate and the membrane electrode assembly is more conducive to the discharge of liquid water under the ribs of a fuel cell.

In the figures, 1—anode plate, 101—anode channel, 1011—anode channel left side plate, 1012—anode channel right side plate, 102—anode rib plate, 103—anode cooling channel, 2—cathode plate, 201—cathode channel, 2011—cathode channel left side plate, 2012—cathode channel right side plate, 202—cathode rib plate, 203—cathode cooling channel, 3—membrane electrode assembly, 4—stack cooling channel, 5—anode gas inlet, 6—anode gas outlet, 7—cathode gas inlet, 8—cathode gas outlet, 9—cooling liquid inlet, 10—cooling liquid outlet.

DETAILED DESCRIPTION OF THE INVENTION

The invention will be described in detail below with reference to accompanying drawings and specific embodiments.

Embodiment 1

Figure 1:
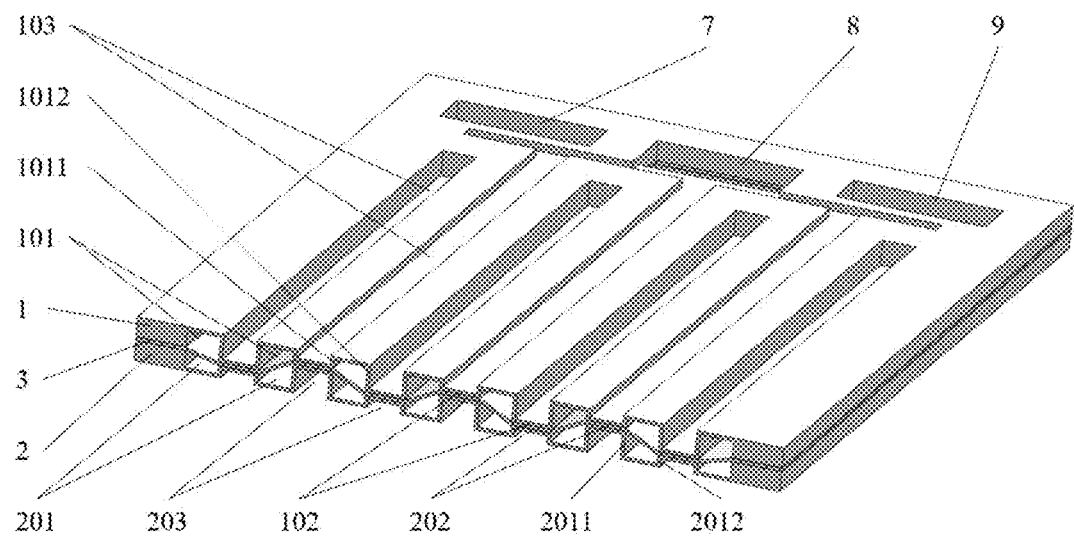
FIG. 1 is a schematic diagram of an internal structure of a single cell according to Embodiment 1.
Figure 2:
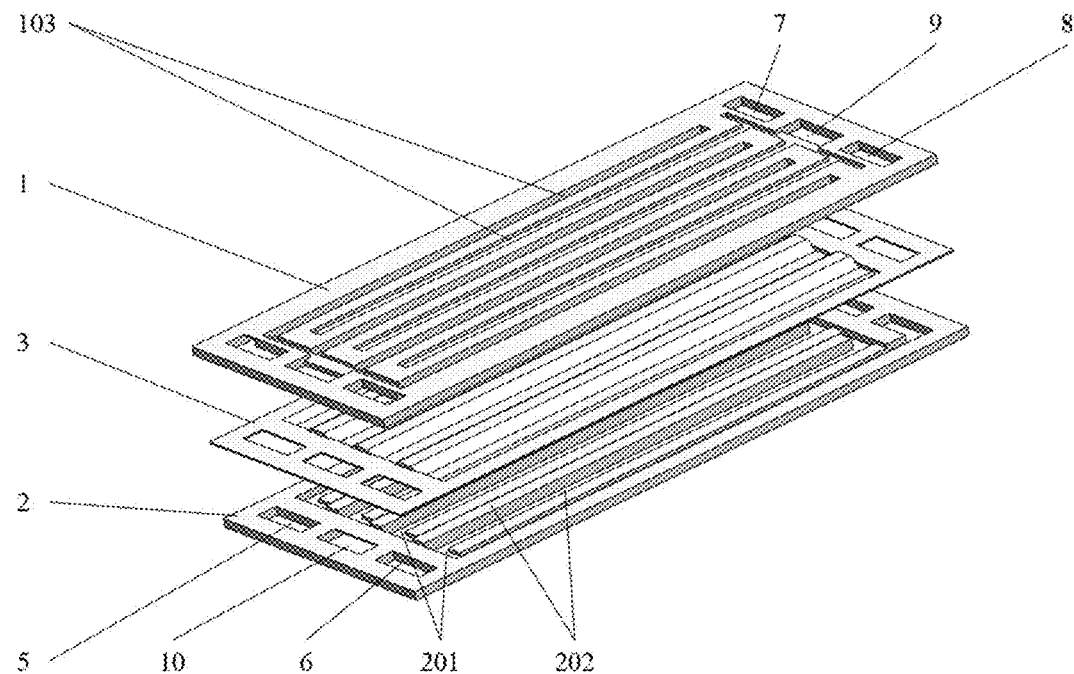
FIG. 2 is a schematic diagram of an overall structure of the single cell according to Embodiment 1.

As shown in FIGS. 1 and 2, illustrated is a single corrugated fuel cell. The single cell includes an anode plate 1, a cathode plate 2, and a membrane electrode assembly 3; the anode plate 1 is of a corrugated structure design, and a plurality of anode channels 101 and anode ribs 102 are alternately arranged on the anode plate 1 in parallel; the cathode plate 2 is of a corrugated structure design engaged with the anode plate 1 and a plurality of cathode channels 201 and cathode separator plates 202 are alternately arranged on the cathode plate 2 in parallel; the anode channels 101 are parallel with the cathode channels 201. The membrane electrode assembly 3 is mounted between the anode plate 1 and the cathode plate 2, and the entire single cell presents a corrugated structure in a width direction of the channel.

The anode plate 1 and the cathode plate 2 are both processed and manufactured by metal sheet stamping and forming process, and are made from metal alloy sheets with a thickness of 0.1 mm through blanking, stamping, punching, trimming, and other processes. The reaction area of the membrane electrode assembly 3 includes a proton exchange membrane coated with a catalyst, a cathode gas diffusion layer, and an anode gas diffusion layer. The frame for membrane electrode assembly is made of a flexible PEN material with a thickness of 0.2 mm through blanking, hot pressing, punching, trimming, and other processes.

The anode channels 101 with a constant width of 1 mm and the anode ribs 102 with a constant width of 1 mm are arranged alternately in parallel on the anode plate 1; the height of an anode channel left side plate 1011 and the height of an anode channel right side plate 1012 alternately vary between 0.25 mm and 0.75 mm, respectively; the angle between the anode channel left side plate 1011 and the bottom of the anode channel 101 and the angle between the anode channel right side plate 1012 and the bottom of the anode channel 101 are both 90°; the height difference between the two side plates of the adjacent anode channels 101 remains constant.

The cathode channels 201 with a constant width of 1 mm and the anode ribs 202 with a constant width of 1 mm are arranged alternately in parallel on the cathode plate 2; the height of a cathode channel left side plate 2011 and the height of a cathode channel right side plate 2012 alternately vary between 0.75 mm and 0.25 mm, respectively; the angle between the cathode channel left side plate 2011 and the bottom of the cathode channel 201 and the angle between the cathode channel right side plate 2012 and the bottom of the cathode channel 201 are both 90°; the height difference between the two side plates of the adjacent cathode channels 201 remains constant.

The membrane electrode assembly 3 is mounted between the anode plate 1 and the cathode plate 2, the lower surface of the anode plate 1 of a corrugated structure is engaged with the upper surface of the membrane electrode assembly 3, and the upper surface of the cathode plate 2 of a corrugated structure is engaged with the lower surface of the membrane electrode assembly 3.

Figure 3:
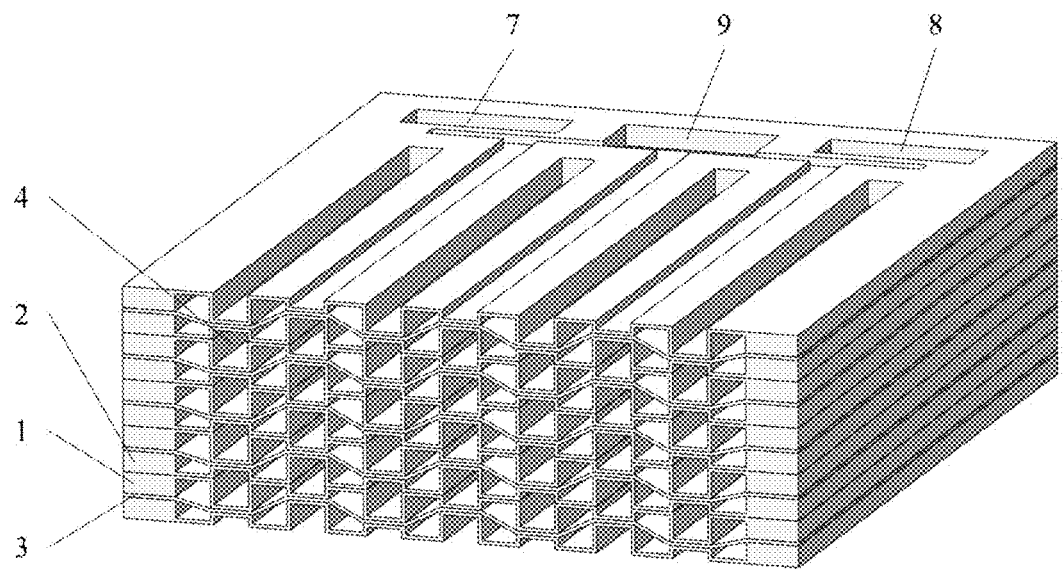
FIG. 3 is a schematic diagram of an internal structure of a stack according to Embodiment 1.

As shown in FIG. 3, illustrated is a stack including the above-mentioned corrugated fuel cell is formed by stacking a certain number of fuel cells in the height direction of the cell. In the stack, the cathode plate 2 of the single cell at the upper layer and the anode plate 1 of the single cell at the lower layer are connected by laser welding. The anode cooling channels 103 and the cathode cooling channels 203 on the anode plate 1 and the cathode plate 2 together form the stack cooling channel 4 with a closed rectangular section.

The stack further includes an anode gas inlet 5, an anode gas outlet 6, a cathode gas inlet 7, a cathode gas outlet 8, a cooling liquid inlet 9, and a cooling liquid outlet 10. All the single cells in the stack share the above channels.

Relative to the common single cell, the single cell of this embodiment is implemented on the basis that the side of the anode channel 101 and of the cathode channel 201 in contact with the membrane electrode assembly 3 is changed from the original plane to the inclined surface, which increases the reaction area of the membrane electrode assembly, thus improving the power density of the fuel cell. Taking a fuel cell stack with an output power of 100 kW and a mass of 50 kg as an example, the power density of the stack having the structure of this embodiment can theoretically be improved by 0.236 kW/kg, ignoring the change in the mass of the fuel cell stack caused by the corrugated membrane electrode assembly.

Embodiment 2

Figure 4:
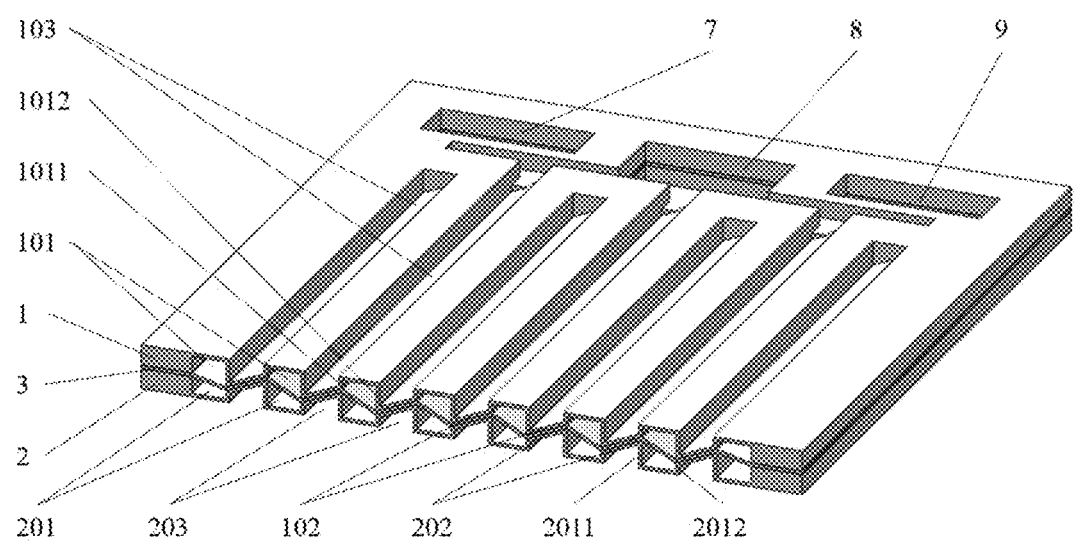
FIG. 4 is a schematic diagram of an internal structure of a single cell according to Embodiment 2.
Figure 5:
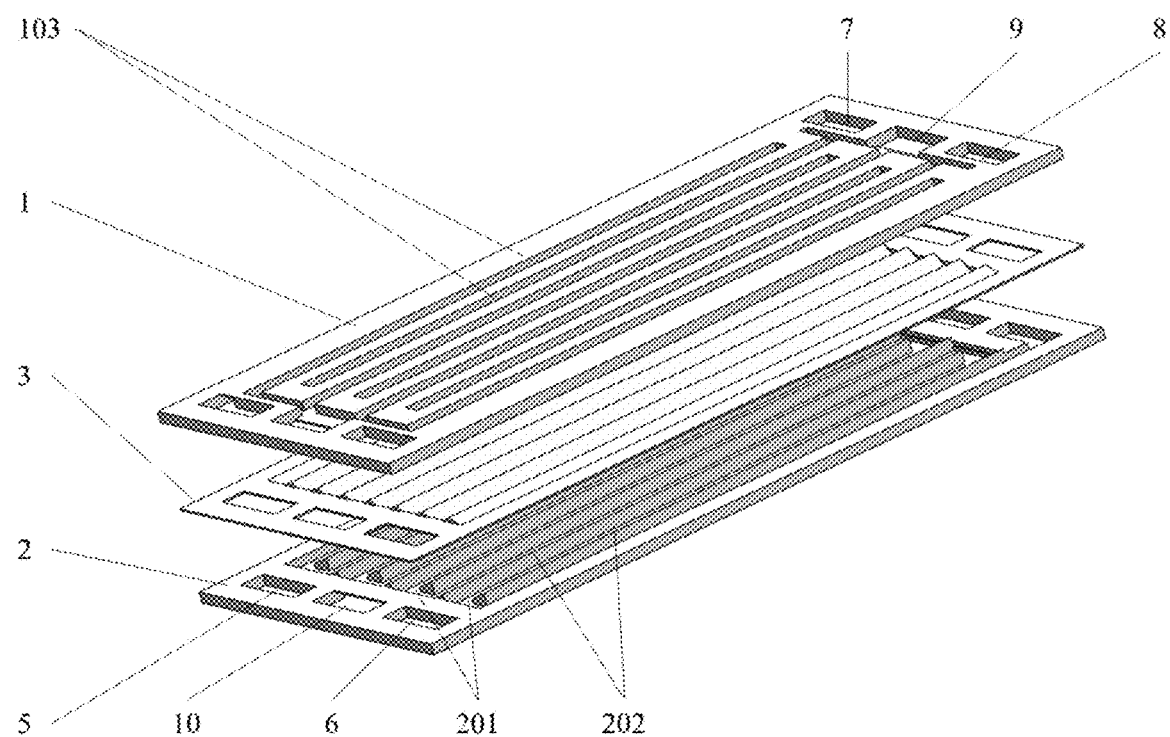
FIG. 5 is a schematic diagram of an overall structure of the single cell according to Embodiment 2.

As shown in FIGS. 4 and 5, illustrated is a single corrugated fuel cell. The single cell includes an anode plate 1, a cathode plate 2, and a membrane electrode assembly 3; the anode plate 1 is of a corrugated structure design, and a plurality of anode channels 101 and anode ribs 102 are alternately arranged on the anode plate 1 in parallel; the cathode plate 2 is of a corrugated structure design engaged with the anode plate 1 and a plurality of cathode channels 201 and cathode ribs 202 are alternately arranged on the cathode plate 2 in parallel; the anode channels 101 are parallel with the cathode channels 201. The membrane electrode assembly 3 is mounted between the anode plate 1 and the cathode plate 2. The entire single cell presents a corrugated structure in a width direction of the channel.

The anode plate 1 and the cathode plate 2 are both processed and manufactured by metal sheet stamping and forming process, and are made from metal alloy sheets with a thickness of 0.1 mm through blanking, stamping, punching, trimming, and other processes. The reaction area of the membrane electrode assembly 3 includes a proton exchange membrane coated with a catalyst, a cathode gas diffusion layer, and an anode gas diffusion layer which are hot pressed together. The frame is made of a flexible PEN material with a thickness of 0.2 mm through blanking, hot pressing, punching, trimming, and other processes.

The anode channels 101 with a constant width of 1 mm and the anode ribs 102 with a constant width of 1 mm are arranged alternately in parallel on the anode plate 1; the height of an anode channel left side plate 1011 and the height of an anode channel right side plate 1012 are 0.25 mm and 0.75 mm, respectively; the angle between the anode channel left side plate 1011 and the bottom of the anode channel 101 and the angle between the anode channel right side plate 1012 and the bottom of the anode channel 101 are both 90°;

the height difference between the two side plates of the adjacent anode channels 101 remains constant.

The cathode channels 201 with a constant width of 1 mm and the anode ribs 202 with a constant width of 1 mm are arranged alternately in parallel on the cathode plate 2; the height of a cathode channel left side plate 2011 and the height of a cathode channel right side plate 2012 are 0.75 mm and 0.25 mm, respectively; the angle between the cathode channel left side plate 2011 and the bottom of the cathode channel 201 and the angle between the cathode channel right side plate 2012 and the bottom of the anode channel 201 are both 90°; the height difference between the two side plates of the adjacent cathode channels 201 remains constant.

The membrane electrode assembly 3 is mounted between the anode plate 1 and the cathode plate 2, the lower surface of the anode plate 1 of a corrugated structure is engaged with the upper surface of the membrane electrode assembly 3, and the upper surface of the cathode plate 2 of a corrugated structure is engaged with the lower surface of the membrane electrode assembly 3.

Figure 6:
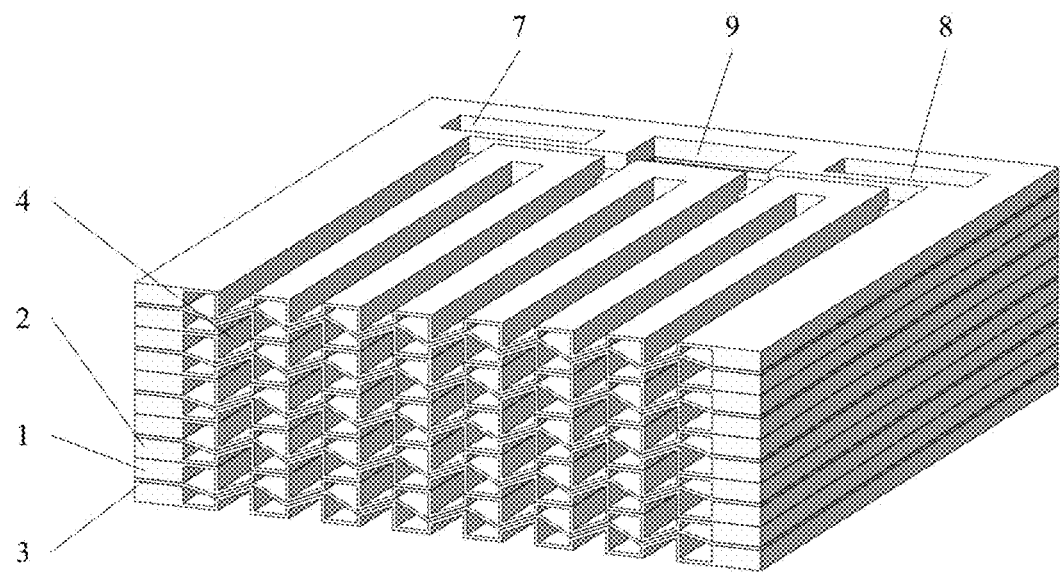
FIG. 6 is a schematic diagram of an internal structure of a stack according to Embodiment 2.

As shown in FIG. 6, illustrated is a stack including the above-mentioned corrugated fuel cell is formed by stacking a certain number of fuel cells in the height direction of the cell. In the stack, the cathode plate 2 of the single cell at the upper layer and the anode plate 1 of the single cell at the lower layer are connected by laser welding. The anode cooling channels 103 and the cathode cooling channels 203 on the anode plate 1 and the cathode plate 2 together form the stack cooling channel 4 with a closed diamond-shaped section.

The stack further includes an anode gas inlet 5, an anode gas outlet 6, a cathode gas inlet 7, a cathode gas outlet 8, a cooling liquid inlet 9, and a cooling liquid outlet 10. All the single cells in the stack share the above channels.

Relative to the common single cell, the single cell of this embodiment is implemented on the basis that the side of the anode channel 101 and of the cathode channel 201 in contact with the membrane electrode assembly 3 is changed from the original plane to the inclined surface and the anode rib plate 102 and the cathode rib plate 202 are also changed from planes to inclined surfaces, which further increases the reaction area of the membrane electrode assembly and reduces the contact resistance, thus improving the power density of the fuel cell. Taking a fuel cell stack with an output power of 100 kW and a mass of 50 kg as an example, the power density of the stack having the structure of this embodiment can theoretically be improved by 0.472 kW/kg, ignoring the change in the mass of the fuel cell stack caused by the corrugated membrane electrode assembly.

The relevant parameters in the above embodiments are only for better describing the specific content of this work to the scientific and technical workers, and corrugated structures with different performances can be easily obtained by adjusting the above parameters. Therefore, the scope of the present invention includes but is not limited to the above embodiments.

What is claimed is:

1. A single corrugated fuel cell, comprising:
an anode plate;
a cathode plate; and
a membrane electrode assembly,
wherein the anode plate is of a corrugated structure, having: a plurality of inclined anode channels with different heights of anode channel left side plates and anode channel right side plates; and anode ribs with slopes being arranged on the anode plate in parallel, the cathode plate is of a corrugated structure engaged with the anode plate, having: a plurality of inclined cathode channels with different heights of cathode channel left side plates and cathode channel right side plates; and cathode ribs with slopes being arranged on the cathode plate in parallel, a lower surface of the anode rib is a plane with a slope, an upper surface of the cathode rib is a plane with a slope, and the lower surface of the anode rib and the upper surface of the cathode rib are parallel to each other, the membrane electrode assembly is mounted between the anode plate and the cathode plate, wherein an upper surface of the membrane electrode assembly is engaged with a lower surface of the anode plate, a lower surface of the membrane electrode assembly is engaged with an upper surface of the cathode plate, and the structure of the membrane electrode assembly is jointly determined by the anode plate and the cathode plate, a part of the membrane electrode assemblies mounted between the anode channels and cathode channels are inclined, and a part of the membrane electrode assemblies mounted between the anode ribs and cathode ribs are planes with slopes, the single corrugated fuel cell presents a corrugated structure in the width direction of the anode channel, the membrane electrode assembly presents a corrugated structure in the width direction of the anode channel, and the interface between the anode plate and the membrane electrode assembly, as well as the interface between the cathode plate and the membrane electrode assembly presents a corrugated structure.

2. The single corrugated fuel cell according to claim 1, wherein the anode channels and the anode ribs are alternately distributed in parallel on the anode plate,
the anode channels are respectively connected with an anode gas inlet and an anode gas outlet, and
anode cooling channels are arranged at back of the anode ribs and respectively connected with a cooling liquid inlet and a cooling liquid outlet.

3. The single corrugated fuel cell according to claim 1, wherein the cathode channels and the cathode ribs are alternately distributed in parallel on the cathode plate,
the cathode channels are respectively connected with a cathode gas inlet and a cathode gas outlet,
and cathode cooling channels are arranged at the back of the cathode ribs and respectively connected with the cooling liquid inlet and the cooling liquid outlet.

4. The single corrugated fuel cell according to claim 2, wherein a side of a bottom of the anode channel away from the membrane electrode assembly is of a closed planar structure,
a side of a top of the anode channel in contact with the membrane electrode assembly is of an open structure, and
an angle between an anode channel left side plate and the bottom of the anode channel and an angle between an anode channel right side plate and the bottom of the anode channel are both not less than 90°.

5. The single corrugated fuel cell according to claim 2, wherein a height difference between the anode channel left side plate and the anode channel right side plate facing each other of adjacent anode channels, a width of the adjacent anode channels, and a width of the adjacent anode ribs are constant or vary according to a set rule in the width direction of the anode channel.

6. The single corrugated fuel cell according to claim 3, wherein a side of a bottom of the cathode channel away from the membrane electrode assembly is of a closed planar structure, a side of a top of the cathode channel in contact with the membrane electrode assembly is of an open structure, an angle between a cathode channel left side plate and the bottom of the cathode channel and an angle between a cathode channel right side plate and the bottom of the cathode channel are both not less than 90°, and a sum of the heights of the anode channel left side plate and the corresponding cathode channel left side plate in a planar view is equal to a sum of the heights of the anode channel right side plate and the corresponding cathode channel right side plate in the planar view.

7. The single corrugated fuel cell according to claim 3, wherein a height difference between the cathode channel left side plate and the cathode channel right plate facing each other of adjacent cathode channels, widths of the adjacent cathode channels, and a width of the cathode rib between the adjacent cathode channels are correspondingly equal to the height difference between the anode channel left side plate and the anode channel right side plate facing each other of adjacent anode channels, widths of the adjacent anode channels, and a width of the anode rib between the adjacent anode channels, respectively.

8. A stack comprising the single corrugated fuel cell according to claim 1,
wherein the stack is formed by stacking a plurality of the single corrugated fuel cells in sequence along a height direction of the single corrugated fuel cell, the anode plates and the cathode plates of adjacent single corrugated fuel cells in the stack are oppositely assembled, and anode cooling channels and cathode cooling channels together form closed-section stack cooling channels, the stack presenting a corrugated structure along a width direction of the anode channel.

9. The stack according to claim 8, wherein all the single corrugated fuel cells in the stack share an anode gas inlet, an anode gas outlet, a cathode gas inlet, a cathode gas outlet, a cooling liquid inlet, and a cooling liquid outlet.

10. The single corrugated fuel cell of claim 1,
wherein, when measured in the width direction of the anode channel, a width of the anode channel is the same as a width of a cathode channel that corresponds to the anode channel, and
a width of the anode plate is the same as a width of a cathode plate that corresponds to the anode plate.

11. The single corrugated fuel cell of claim 4,
wherein, when measured in the width direction of the anode channel, a width of the anode channel is the same as a width of a cathode channel that corresponds to the anode channel, and
a width of the anode plate is the same as a width of a cathode plate that corresponds to the anode plate.

12. The stack according to claim 8,
wherein, when measured in the width direction of the anode channel, a width of the anode channel is the same as a width of a cathode channel that corresponds to the anode channel, and
a width of the anode plate is the same as a width of a cathode plate that corresponds to the anode plate.

* * * * *